(12) United States Patent
Welinitz et al.

(10) Patent No.: US 11,150,997 B2
(45) Date of Patent: Oct. 19, 2021

(54) ADAPTIVE BANDWIDTH MANAGEMENT OF A REPLICATION PROCESS

(71) Applicants: James Welinitz, Framingham, MA (US); Nathaniel W. Turner, Providence, RI (US); Matthew B. Kirk, Needham, MA (US); Charles Packard, Marlborough, MA (US)

(72) Inventors: James Welinitz, Framingham, MA (US); Nathaniel W. Turner, Providence, RI (US); Matthew B. Kirk, Needham, MA (US); Charles Packard, Marlborough, MA (US)

(73) Assignee: Exagrid Systems, Inc., Marlborough, MA (US)

( * ) Notice: Subject to any disclaimer, the term of this patent is extended or adjusted under 35 U.S.C. 154(b) by 788 days.

(21) Appl. No.: 14/829,885

(22) Filed: Aug. 19, 2015

(65) Prior Publication Data
US 2017/0060696 A1    Mar. 2, 2017

(51) Int. Cl.
*G06F 3/06* (2006.01)
*G06F 11/14* (2006.01)
*G06F 11/20* (2006.01)

(52) U.S. Cl.
CPC .......... *G06F 11/1453* (2013.01); *G06F 3/065* (2013.01); *G06F 3/067* (2013.01);
(Continued)

(58) Field of Classification Search
CPC ............. G06F 11/1453; G06F 11/1461; G06F 11/1464; G06F 11/2097; G06F 3/0613; G06F 3/065; G06F 11/2094
(Continued)

(56) References Cited

U.S. PATENT DOCUMENTS

| 5,574,906 A | 11/1996 | Morris |
| 5,813,017 A | 9/1998 | Morris |

(Continued)

FOREIGN PATENT DOCUMENTS

| EP | 0 774 720 A2 | 5/1997 |
| EP | 0 774 720 A3 | 5/1997 |

(Continued)

OTHER PUBLICATIONS

Microsoft, "Edit Replication Schedules and Bandwidth," Oct. 2013, 2 pages printed on Feb. 20, 2018 from https://docs.microsoft.com/en-us/previous-versions/windows/it-pro/windows-server-2008-R2-and-2008/cc732278(v=ws.11).*

(Continued)

*Primary Examiner* — Tony Mahmoudi
*Assistant Examiner* — Michael Le
(74) *Attorney, Agent, or Firm* — Mintz Levin Cohn Ferris Glovksy and Popeo, P.C.

(57) ABSTRACT

A system, a method, and a computer program product for adaptively management bandwidth of a deduplication system are disclosed. A bandwidth policy for replication of data from a first deduplication location to a second deduplication location is determined. The bandwidth policy allocates a predetermined bandwidth for the replication of data. The deduplication locations are communicatively coupled via a network. Using the determined bandwidth policy, data from the first deduplication location is replicated to the second deduplication location based on the allocated bandwidth.

18 Claims, 9 Drawing Sheets

(52) U.S. Cl.
CPC .......... *G06F 3/0613* (2013.01); *G06F 3/0641* (2013.01); *G06F 11/1461* (2013.01); *G06F 11/1464* (2013.01); *G06F 11/2097* (2013.01); *G06F 11/2094* (2013.01); *G06F 2201/80* (2013.01); *G06F 2201/82* (2013.01)

(58) Field of Classification Search
USPC .......................................................... 707/692
See application file for complete search history.

(56) References Cited

U.S. PATENT DOCUMENTS

| | | | |
|---|---|---|---|
| 6,460,055 B1* | 10/2002 | Midgley | G06F 11/1461 707/640 |
| 7,539,745 B1 | 5/2009 | Wang et al. | |
| 7,562,186 B2 | 7/2009 | Li et al. | |
| 7,769,722 B1* | 8/2010 | Bergant | 707/681 |
| 7,962,520 B2 | 6/2011 | Patterson et al. | |
| 8,285,957 B1 | 10/2012 | Nag et al. | |
| 8,315,985 B1 | 11/2012 | Ohr et al. | |
| 8,332,354 B1* | 12/2012 | Chatterjee | G06F 11/1461 707/624 |
| 8,412,848 B2 | 4/2013 | Therrien et al. | |
| 8,447,740 B1 | 5/2013 | Huang et al. | |
| 8,812,738 B2 | 8/2014 | Therrien et al. | |
| 8,898,120 B1 | 11/2014 | Efstathopoulos | |
| 8,972,672 B1 | 3/2015 | Wallace et al. | |
| 9,110,898 B1 | 8/2015 | Chamness et al. | |
| 9,286,313 B1 | 3/2016 | Sharangpani | |
| 9,384,205 B1 | 7/2016 | Gipp et al. | |
| 9,477,661 B1 | 10/2016 | Chamness et al. | |
| 2002/0073106 A1 | 6/2002 | Parker et al. | |
| 2005/0050287 A1* | 3/2005 | Boyd | H04L 67/1095 711/162 |
| 2007/0239945 A1 | 10/2007 | Li et al. | |
| 2008/0168246 A1* | 7/2008 | Haustein | G06F 11/2071 711/162 |
| 2008/0177963 A1* | 7/2008 | Rogers | H04L 67/1097 711/162 |
| 2008/0195677 A1 | 8/2008 | Sudhakar et al. | |
| 2008/0282048 A1* | 11/2008 | Miura | G06F 11/1464 711/162 |
| 2009/0157768 A1* | 6/2009 | Ichikawa | G06F 11/2074 |
| 2009/0182789 A1 | 7/2009 | Sandorfi et al. | |
| 2010/0306412 A1 | 12/2010 | Therrien et al. | |
| 2011/0119240 A1 | 5/2011 | Shapira | |
| 2011/0273982 A1 | 11/2011 | Akirav et al. | |
| 2012/0137173 A1* | 5/2012 | Burshan | G06F 9/45533 714/15 |
| 2012/0150798 A1* | 6/2012 | Dawson | G06F 3/0613 707/622 |
| 2012/0303680 A1 | 11/2012 | McLennan et al. | |
| 2013/0024435 A1 | 1/2013 | Poirier et al. | |
| 2013/0066868 A1 | 3/2013 | Hecker et al. | |
| 2013/0322255 A1* | 12/2013 | Dillon | H04L 47/22 370/236 |
| 2014/0052700 A1 | 2/2014 | VanderSpek et al. | |
| 2014/0089260 A1* | 3/2014 | Amrhein | G06F 9/45504 707/615 |
| 2014/0143219 A1 | 5/2014 | Therrien et al. | |
| 2014/0149350 A1* | 5/2014 | Chen | H04L 67/1095 707/634 |
| 2014/0258655 A1 | 9/2014 | Park et al. | |
| 2014/0279956 A1 | 9/2014 | Trimble et al. | |
| 2014/0297588 A1* | 10/2014 | Babashetty | G06F 11/3027 707/613 |
| 2015/0227431 A1* | 8/2015 | Fiske | G06F 3/0619 711/162 |
| 2015/0326481 A1 | 11/2015 | Rector | |
| 2016/0026535 A1* | 1/2016 | Bhat | G06F 11/2097 714/19 |
| 2016/0248676 A1* | 8/2016 | Thanasekaran | G06F 3/067 |
| 2016/0253351 A1 | 9/2016 | Hansen et al. | |
| 2016/0342618 A1 | 11/2016 | Watkins et al. | |
| 2016/0364300 A1* | 12/2016 | Kulkarni | G06F 11/1461 |
| 2017/0046360 A1 | 2/2017 | Therrien et al. | |

FOREIGN PATENT DOCUMENTS

| | | |
|---|---|---|
| EP | 0 774 720 B1 | 5/1997 |
| EP | 2 698 732 A1 | 2/2014 |
| EP | 3 062 227 A1 | 8/2016 |
| EP | 3 098 714 A1 | 11/2016 |
| WO | WO-01/52116 A1 | 7/2001 |
| WO | WO-01/52116 A8 | 7/2001 |

OTHER PUBLICATIONS

Anonymous (May 2, 2012). "Throttling process (computing)—Wikipedia," located at <https://en.wikipedia.org/wiki/Throttling_process_(computing)>, last visited Apr. 11, 2018, 1 page.
Bhagwat, D. et al. (Dec. 2009). "Extreme Binning: Scalable, Parallel Deduplication for Chunk-based File Backup," located at <http://ieeexplore.ieee.org/stamp/stamp.jsp?tp=&arnumber=5366623> 9 pages.
1997 Research Paper, *Efficient Distributed Backup with Delta Compression* (Randal C. Burns, Darrell D.E. Long), 11 pages.
2000 Research Paper, *File System Support for Delta Compression* (Joshua P. MacDonald), 32 pages.
2002 Research Paper, *Cluster-based Delta Compression of a Collection of Files* (Zan Ouyang, Nasir Memon, Torsten Suel, Dimitre Trendafilov), 10 pages.
Extended European Search Report dated Nov. 22, 2013, for EP Application No. 13180747.1, filed Aug. 16, 2013, 5 pages.
Extended European Search Report dated Aug. 2, 2016, for EP Application No. 16157662.4, filed Feb. 26, 2016, 7 pages.
Extended European Search Report dated Feb. 23, 2017 for EP Patent Application No. 16184062.4, 7 pages.
Extended European Search Report dated Mar. 23, 2017, for EP Application No. EP16184063.2, filed on Aug. 12, 2016, 8 pages.

* cited by examiner

ADAPTIVE BANDWIDTH MANAGEMENT OF A REPLICATION PROCESS

TECHNICAL FIELD

In some implementations, the current subject matter relates to data processing, and in particular, to adaptive management of a replication process.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup applications employ a plurality of techniques to manage data designated for backup. One such technique includes deduplication. Deduplication can be used to eliminate redundancy in data stream created during the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

Deduplication involves identifying similar or identical patterns of bytes within a data stream, and replacing those bytes with fewer representative bytes. By doing so, deduplicated data consumes less disk storage capacity than data that has not been deduplicated and when the data stream must be transmitted between two geographically separate locations, consumes less network bandwidth. Adaptive deduplication strategies combine inter-file and/or intra-file discovery techniques to achieve the aforementioned goals.

Companies typically replicate backup data from a primary data center to one or more geographically remote data centers to provide recovery protection from primary site system disasters. Historically, site disaster recovery processes involved storing backup data on magnetic tapes and shipping tapes to an offsite storage location (e.g., a remote location). When data needs to be dispersed geographically from one data center to another across metropolitan, regional, national or international distances, wide-area networking ("WAN") technology is used. Now, WANs are used to connect local area networks ("LAN") within data centers and replace magnetic tape-based disaster recovery procedures with disk-based storage/server inter-site replication schemes. Further, WAN bandwidth is typically offered as a service by companies that own and/or maintain some form of networking infrastructure. The greater the bandwidth, the costlier the WAN service can be to a company that may require it. Underutilization of the WAN connection between data centers can be costly since the company purchasing the WAN service is charged the same monthly charge whether the WAN bandwidth is used or not. Overutilization can incur very expensive overage charges over the base service costs.

Additionally, many competing applications within the data centers share the available WAN bandwidth, thereby reducing available bandwidth. There may be specific minutes/hours of the day when a specific primary site server can be prohibited from and/or limited to sending less data than the total bandwidth to the secondary site.

Most conventional deduplication backup appliances typically use a single "compute server" to collect backup data from a backup application, with capacity expansion offered by simple disk storage appliances that have no user-programmable compute capability. These primary site compute servers are often configured to replicate data to a similar compute server at a geographically remote location for the purpose of providing disaster recovery in the event of a primary site disaster. WAN is typically used to transmit data from the primary site compute server to a second site compute server. This one-to-one relationship of a single primary site compute server sending data to single secondary site compute server makes the management of WAN replication a trivial task of limiting the WAN bandwidth that may be consumed by the single source compute server for specific time periods during the day.

Unlike most single compute server deduplication backup appliances, deduplication grids include an expandable number of compute servers called grid servers. Each grid server may collect data from one or more backup servers, and store that data on magnetic disk or solid-state disk storage units located within the grid server. In order to meet the requirement that this local backup data also be stored in at least one geographically distant location away from the primary site, a second collection of grid servers that form an offsite deduplication grid is also deployed and backup data is regularly replicated to the grid servers at that remote site via a WAN.

However, conventional systems are unable to manage network bandwidth across multiple grid servers within a grid at a primary site that may be needed for effective replication of data from one site to another. Thus, there is a need for a way to determine how much bandwidth to allocate to each of the grid servers within a grid compute/storage system that may be required for efficient replication of data as well as provide management functions to ensure full utilization of such bandwidth.

SUMMARY

In some implementations, the current subject matter relates to a computer-implemented method for adaptively managing bandwidth. The method can include determining a bandwidth policy for replication of data from a first deduplication location to a second deduplication location, the bandwidth policy allocating a predetermined bandwidth for the replication of data, the deduplication locations are communicatively coupled via a network; and replicating, using the determined bandwidth policy, data from the first deduplication location to the second deduplication location based on the allocated bandwidth. At least one of the determining and the replicating can be performed using at least one processor of at least one computing system.

In some implementations, the current subject matter can include one or more of the following optional features. The first deduplication site can include at least one first grid server for transmitting deduplicated data and the second deduplication site includes at least one second grid server for receiving the deduplicated data from the at least one first grid server. The bandwidth policy can be determined for replicating data from the first grid server to the second grid server.

In some implementations, the bandwidth policy can includes an indication of a time period during which the bandwidth policy is applicable to a server in at least one of the first deduplication location and the second deduplication location. The method can also include performing, based on the determined bandwidth policy, at least one of the following: allocating additional bandwidth for consumption by the server, reducing an amount of bandwidth being consumed by the server, and unchanging an amount of bandwidth being consumed by the server. The allocating, reducing, and unchanging can be determined based on a total available bandwidth for at least one of the following: the first deduplication location and the second deduplication location.

In some implementations, the method can include determining at least one server in at least one of the first deduplication and the second deduplication location requiring additional bandwidth, and allocating a portion of bandwidth being consumed by at least another server in at least one of the first deduplication and the second deduplication location to the first server.

In some implementations, allocation of bandwidth can be performed using at least one of the following: automatically, manually, periodically, and based on a predetermined time period.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
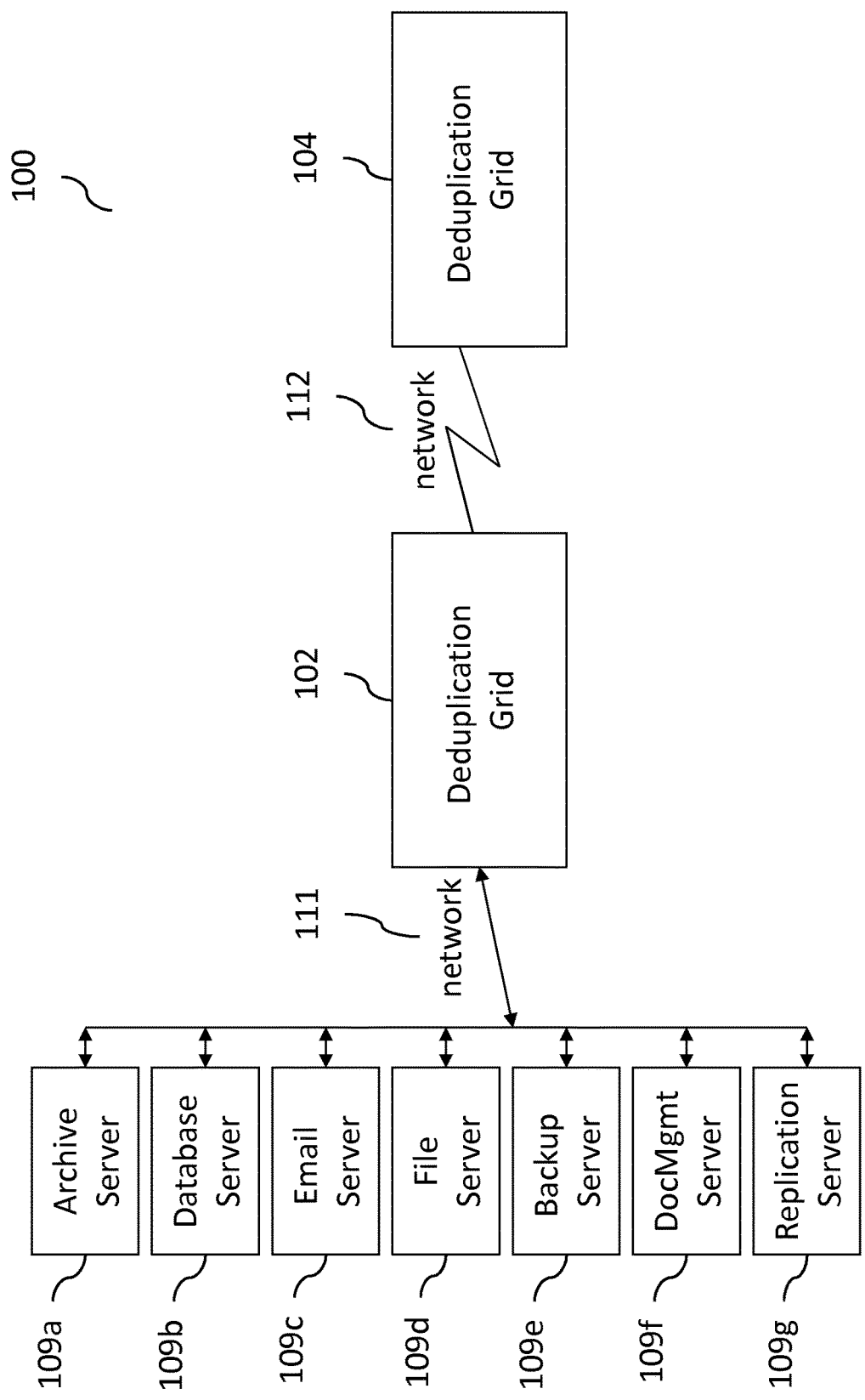
FIG. 1 illustrates an exemplary data deduplication system for deduplicating a stream of data received from a variety of sources, according to some implementations of the current subject matter.

To address these and potentially other deficiencies of currently available solutions, one or more implementations of the current subject matter provide methods, systems, articles or manufacture, and the like that can, among other possible advantages, provide for adaptive management of a replication process and usage of bandwidth associated therewith.

In some implementations, the current subject matter can perform processing of one or more streams of data (e.g., backup streams of data or any other data streams). The data stream can include a plurality data zones and each zone can be associated with a zone stamp that can identify that zone. The current subject matter can generate such zones and zone stamps based on the analysis of the received data steam(s). The zone stamps can be compared to one another (whether or not the zones are within the same data stream or not).

Deduplication can reduce data storage capacity consumption and/or inter-site network bandwidth requirements. Further, data deduplication can reduce an amount of data storage capacity that can be consumed by primary, backup, archive, etc. data storage systems. Further, deduplication can be effective in eliminating redundant data from being transferred across cost and/or bandwidth limited inter-site networks. Deduplication methods can be executed within and/or among a logical collection of internetworked compute and/or data storage servers, which can be referred to as grid servers. Grid servers can receive incoming stream(s) of data for deduplication, store data locally, and/or optionally replicate and store remotely for some period of time. From this incoming data, zones can be created. Zones can be contiguous and/or non-contiguous segments of the incoming data, e.g., entire files, segments of files, an aggregation of multiple files, etc. For each zone in a data stream, a zone stamp can be generated and/or computed based on a content of the zone's data bytes.

A zone stamp can be a string containing up to 64 characters (and/or any other number of characters), which, in some exemplary implementations, can be smaller than or equal to the size of the zone it represents. Because of the smaller size of zone stamps, the entire list of zone stamps can be stored in a main memory (e.g., a high-speed memory location) to allow them to be quickly and/or efficiently compared to each other in order to identify zones whose content is similar and/or identical and/or substantially identical to one another. Such zones of data can then be delta compressed against each other so that the zones can be replaced by one unaltered zone and another delta compressed zone that can contain just the bytes that are different between the zones.

In some implementations, the current subject matter relates to a deduplication grid server network that can perform deduplication of data. The grid server network can include a plurality of grid servers or nodes that are communicatively coupled to one another, where each grid server can include disk storage capacity, processing units, memory capacity, and/or networking ports for performing deduplication methods. The servers can be communicatively coupled using any type of network (e.g., wide area network ("WAN"), local area network ("LAN"), metropolitan area network ("MAN"), internet, extranet, intranet, and/or any other type of wireless and/or wired network).

Using the grid server architecture, each grid server can execute grid deduplication methods on data that can be stored within its own server. This process can be performed by the grid server independently and/or in parallel with other grid servers in the grid server network. Further, since grid servers can be interconnected via the grid server network, they can cooperate and/or communicate with one another to perform deduplication of data across all grid servers in the deduplication grid server network. This grid deduplication activity within and among multiple grid servers can provide scalable performance that can be commensurate with primary storage capacity growth.

Additionally, a loss of any grid server(s) within the network may affect the availability of the zones that it is responsible for storing, however, the current subject matter's grid server network can provide for failover/recovery models, whereby each grid server in the network can be a peer within the grid server network and any services can be relocated from the failed grid server to the remaining operational grid servers.

FIG. 1 illustrates an exemplary data deduplication system 100 for deduplicating a stream of data received from a variety of sources 109 (a, b, c, d, e, f, g). The source 109 can include an archive server 109*a*, a database server 109*b*, an email server 109*c*, a file server 109*d*, a backup server 109*e*, a document management server 109*f*, a replication server 109*g*, as well as any other application, business object, business process, business process application, server, software, hardware, etc. The system 100 can further include deduplication grids 102, 104 and networks 111, 112. The network 111 can communicatively couple the deduplication grid 102 and source of a data stream 109 and the network 112 can communicatively couple the deduplication grid 102 and the deduplication grid 104. In some implementations, the deduplication grid 102 can be located in the same physical location as the sources 109. Alternatively, the grid 102 can be remote from the sources 109. The grid 104 can be remotely located from the sources 109 and/or grid 102. For example, the grid 104 can be a disaster recovery site for the data received from the source 109.

The grids 102 and/or 104 can include one or more computing devices, systems, servers, hardware, software, and/or any combination of hardware and/or software, which can be communicatively coupled with one another using various wireless and/or wired connections, networks, etc. The networks 111, 112 can be any wireless and/or wired networks, WAN, MAN, LAN, Internet, extranet, intranet, as well any other type of network.

In some embodiments, the deduplication grid 102 can receive data stream(s) from sources 109 and can perform an initial deduplication of the received data. Additionally, the grid 102 can also perform reconstituting original un-deduplicated data, when requested to do so by source(s) 109. The deduplicated data can be stored in a storage subsystem local to the grid 102 (not shown in FIG. 1). The deduplicated data can be sent to grid 104 and stored in a storage subsystem local to the grid 104 (not shown in FIG. 1). For example, critical application data can be stored at a local facility (e.g., as represented by the grid 102) and at a geographically distant remote facility (e.g., as represented by the grid 104) in order to provide for a full recovery in the event of system failure, site disaster, or any other unprecedented condition or event.

Figure 2A:
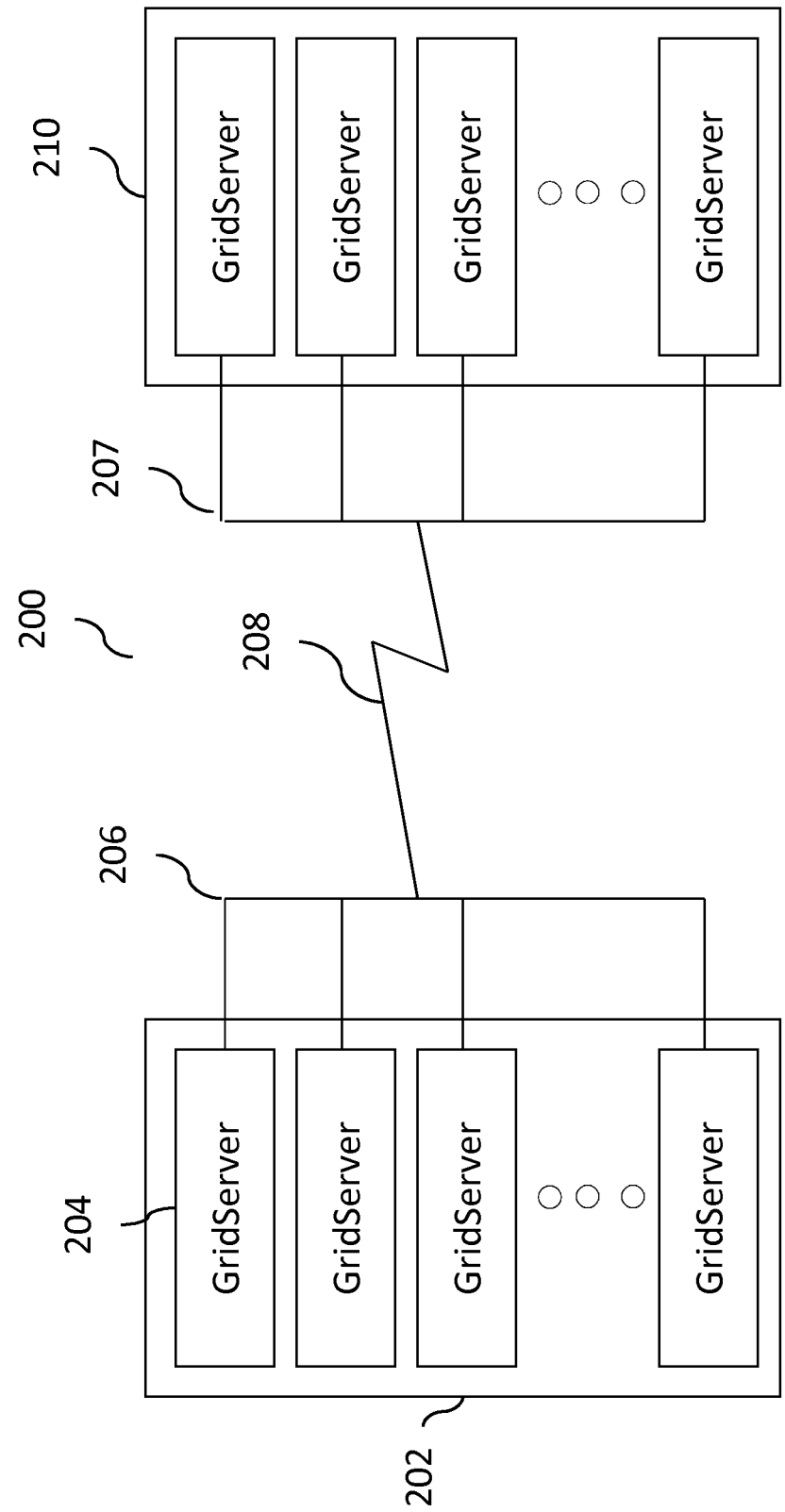
FIG. 2a illustrates an exemplary network, according to some implementations of the current subject matter.

FIG. 2*a* illustrates an exemplary network 200, according to some implementations of the current subject matter. The network 200 can include a plurality of network sites 202 and 210 are shown in FIG. 2*a*), each having a deduplication grid containing a plurality of deduplication grid servers 204. The grid servers 204 within each site 202 and 210 can be communicatively coupled using any wireless and/or wired networks, WAN, MAN, LAN, Internet, extranet, intranet, as well any other type of network 206 and/or 207. The sites 202 and 210 can be communicatively coupled using any wireless and/or wired networks, WAN, MAN, LAN, Internet, extranet, intranet, as well any other type of network 208.

In some implementations, the current subject matter can provide a multi-stage and/or multi-level deduplication of streams of data, which can be received by one or more servers in the network 200. In some implementations, the data stream that can be received can be split into a plurality of zones that can be matched against one another in order to determine whether or not zones are similar to one another, identical, and/or substantially similar (e.g., zones that include similar data content). Zones having similar, identical, and/or substantially similar data content can be deduplicated using delta compression and/or data compression. Other zones that are not similar, identical, and/or substantially similar to any other zone in the received data stream can be further processed using data compression. These size-reduced zones can then be transmitted across network 208, which can save network bandwidth and accelerate the time it can take to replicate all of the zones.

In some implementations, the current subject matter can perform multiple sequential operations during processing of backup data stream(s) into deduplicated and/or replicated zones. The operations can include at least one of the following: backup stream splitting, stamp creation, stamp redistribution, stamp matching, grid delta compression, rebalancing, purging, and/or any other operations and/or any combination thereof. The zones can be purged from the server grid when they are no longer required to be accessed by any of these applications 109. In some implementations, stream splitting, stamp creation, stamp matching, grid delta compression, rebalancing, and/or purging can be performed asynchronously to one another. This can be done to maximize utilization of system resources. The following is a discussion of each of these processes and how such processes can be performed by each grid server in the grid independently while other processes are performed across other servers.

In some implementations, the current subject matter system can perform data stream (e.g., backup stream) splitting and/or stamp creation in accordance with an exemplary process described in U.S. Pat. No. 8,412,848 to Therrien et al., issued Apr. 2, 2013, which is incorporated herein by reference in its entirety. In some implementations, each grid server in the grid server network can perform data stream splitting independently and form zones based on the received data as well as create zone stamps for each formed zones. Each grid server can receive a data stream that can be specifically destined for that particular server and/or, alternatively, grid servers can receive one data stream that can be destined for the network and determine how to split the data stream for further processing by each grid server. Each grid server can create a stamp table that can represent all of the zones that were created within that grid server based on the data in the incoming data stream. The stamp tables can be virtual stamp tables. These stamp tables can be sorted from smallest to largest zone size in order to accelerate downstream stamp matching process. During stamp matching, zone stamps whose zone sizes are +/−P percent different in size can be considered for matching in order to accelerate the stamp matching process.

Figure 2B:
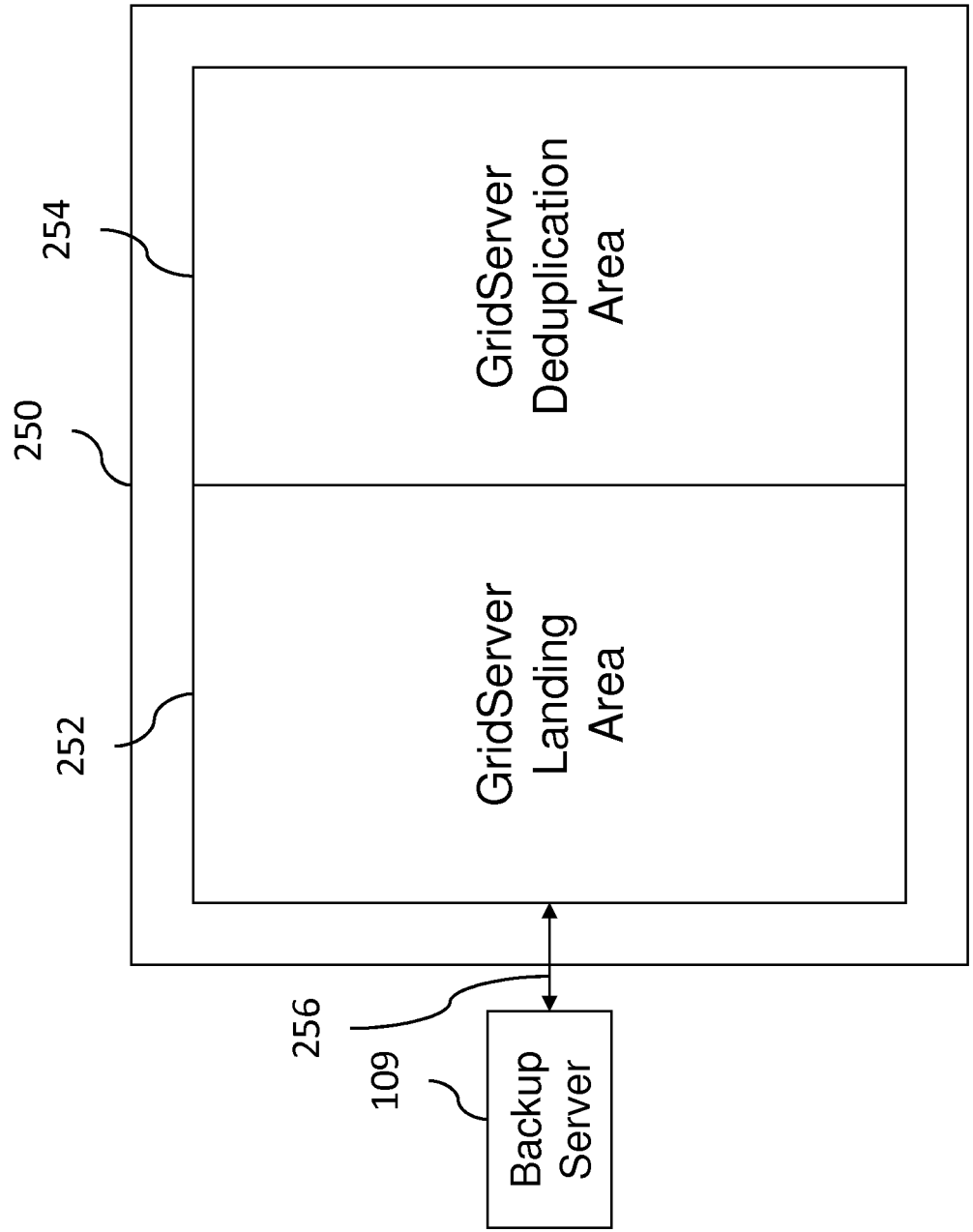
FIG. 2b illustrates an exemplary system for an internal logical storage structure of a grid server, according to some implementations of the current subject matter.

FIG. 2b illustrates an exemplary system 250 for an internal logical storage structure 250 of a grid server, according to some implementations of the current subject matter. The structure 250 can be included a grid server 204 (as shown in FIG. 2a) and can include a grid server landing area 252 and a grid server deduplication area 254. A backup server 109 (as shown in FIG. 1) can be communicatively coupled to the structure 250, and in particular, to the grid server landing area 252.

The backup server 109 can transmit streams of backup data 256 to the grid server 204 (as shown in FIG. 2a). The backup data stream 256 can be stored in the grid server landing area 252 for the purposes of "awaiting" performance of the backup process by performing compression and/or deduplication in parallel on incoming data stream 256. The grid server landing area 252 can include a sufficient storage capacity to cache at least the most recent full backup and/or one or more previous backups. The data stream 256 can be temporarily stored in the grid server landing area 252 and can provide at least one of the following benefits. Data backups can be completed in a shorter amount of time because deduplication and/or compression do not take place simultaneously.

Further, requests to restore data are typically directed to the most recent backup data. This data can be cached in the in the grid server landing area 252 until more backups streams cause that data to be "ejected" from grid server landing area 252 and into the grid server deduplication area 254. In some implementations, such requests to restore data from the grid server landing area 252 might not require that data is reassembled from deduplicated chunks (if the data is restored from the data that has been deduplication/replicated). The restored data can be residing in an uncompressed and/or undeduplicated form in the grid server landing area 252, which can accelerate restore operations.

Moreover, for backup system deployments where one or more grid servers are only deployed at a primary site and not at a secondary disaster recovery site, backup tapes can be created for storage offsite at a tape storage facility. These tapes can be produced from the grid server landing area 252 as soon as a backup job is completed. With the most recent backup data stored in uncompressed and/or undeduplicated form in the grid server landing area 252, the throughput of creating a tape copy can be accelerated as opposed to creating a tape copy from deduplicated data, which can require undeduplication (or "rehydration") of data before writing it to tape.

Additionally, for virtual machine backups, the grid server landing area 252 can provide a fast and accessible NAS storage area for performing an instant recovery of data using the grid server 204 as a temporary primary storage subsystem in the event of a loss of one or more virtual machine primary storage subsystems. This can accelerate the time that it can take to recover from the loss of virtual machine primary storage.

In some implementations, data stored in the grid server landing area 252 can be deduplicated at any time and the resulting data can be stored in the grid server deduplication area 254 of the grid server 204. In some implementations, the current subject matter can perform a determination as to when to move the data stored in the grid server landing area 252 to the grid server deduplication area 254.

In some implementations, the grid server 204 can perform at least one of the following functions: backup/ingestion, deduplication, replication, and/or other functions/tasks.

The backup/ingestion function relates to receiving data from data management applications 109. Applications 109 typically send large amounts of data (e.g., gigabytes to terabytes) into one or more grid servers 204 (shown in FIG. 2a) for processing. The data can be sent based on a particular schedule that can be set by a backup administrator of the application 109. Minimizing an elapsed time to complete all daily backup jobs can be most critical to the backup administrator, since certain customer-facing applications may need to be paused until the backup is complete, and end-users that access that application can be delayed in performing their work until the backup task is complete.

Another function that can be performed by the grid server 204 can be deduplication. Deduplication tasks can be designed to receive data stream that has been ingested into the grid server 204 by a data management application, and segment it into zones. Each zone can be labeled a zone stamp, which can be an identifier that can be used to identify zones that have similar, substantially similar, substantially identical, and/or identical content. During the deduplication task, collection of zone stamps associated with newly created zones from a recent ingestion data stream can be compared against zone stamps that were previously created in order to identify similar zones using similarity of their respective stamps. When a pair of zones is identified as having similar zone stamps, the zones can be delta-compressed to reduce consumed data storage capacity.

Yet another function of the grid server 204 can be replication. In some implementations, a grid server 204 within the data center 202 can optionally have their backup data replicated across a network 208 to grid servers at another site 210. The site 210 can be referred to as a disaster recovery site. A backup administrator can define a predetermined recovery point objective ("RPO") for each backup data set based on, for example, criticality of the data. The RPO can be a measure of time (e.g., seconds, minutes, hours, etc.) that can represent an age of data at the second site as compared to the age of data stored at the primary site. Ideally, an RPO of zero seconds can allow an organization to resume operations up to the last transaction prior to the disaster at the primary site using grid servers at the second site. For most data, RPO can be specified in terms of hours, e.g., less than 24 hours.

In some implementations, other tasks that can be run by grid servers 204 can include at least one of the following: a restore task, a copy-to-tape task, a cross replication task, a purge task, a rebalance task, etc. In some implementations, the current subject matter can dynamically manage each of these additional grid server tasks and/or any other tasks.

Further, the current subject matter can balance backup/ingestion tasks versus deduplication and/or replication tasks. In some implementations, the current subject matter, for the purposes of running these and/or any other tasks on the grid server 204, can dynamically manage grid server 204 processing, memory, networking, storage and/or any other resources to ensure that ingestion performance is not inhibited as well as to perform as much deduplication and/or replication as possible without reducing the ingestion rate. Ingestion performance can be one of the most important customer-visible criteria because the fastest ingestion performance can correspond to the shortest time to backup, thereby affecting end-user productivity if data backups take too long to complete. Further, during certain periods of time, ingestion performance can drop significantly due to delays introduced by the data management application, and/or bursty network protocols (e.g., NFS, CIFS), and/or slow data feeds from backup clients. The current subject matter can perform monitoring of the ingestion rate and upon determination that the rate is low, the grid server 204 can be instructed to increase deduplication and/or replication activity automatically. This can reduce recovery point objective time for data that is replicated to the second site 210.

Figure 3:
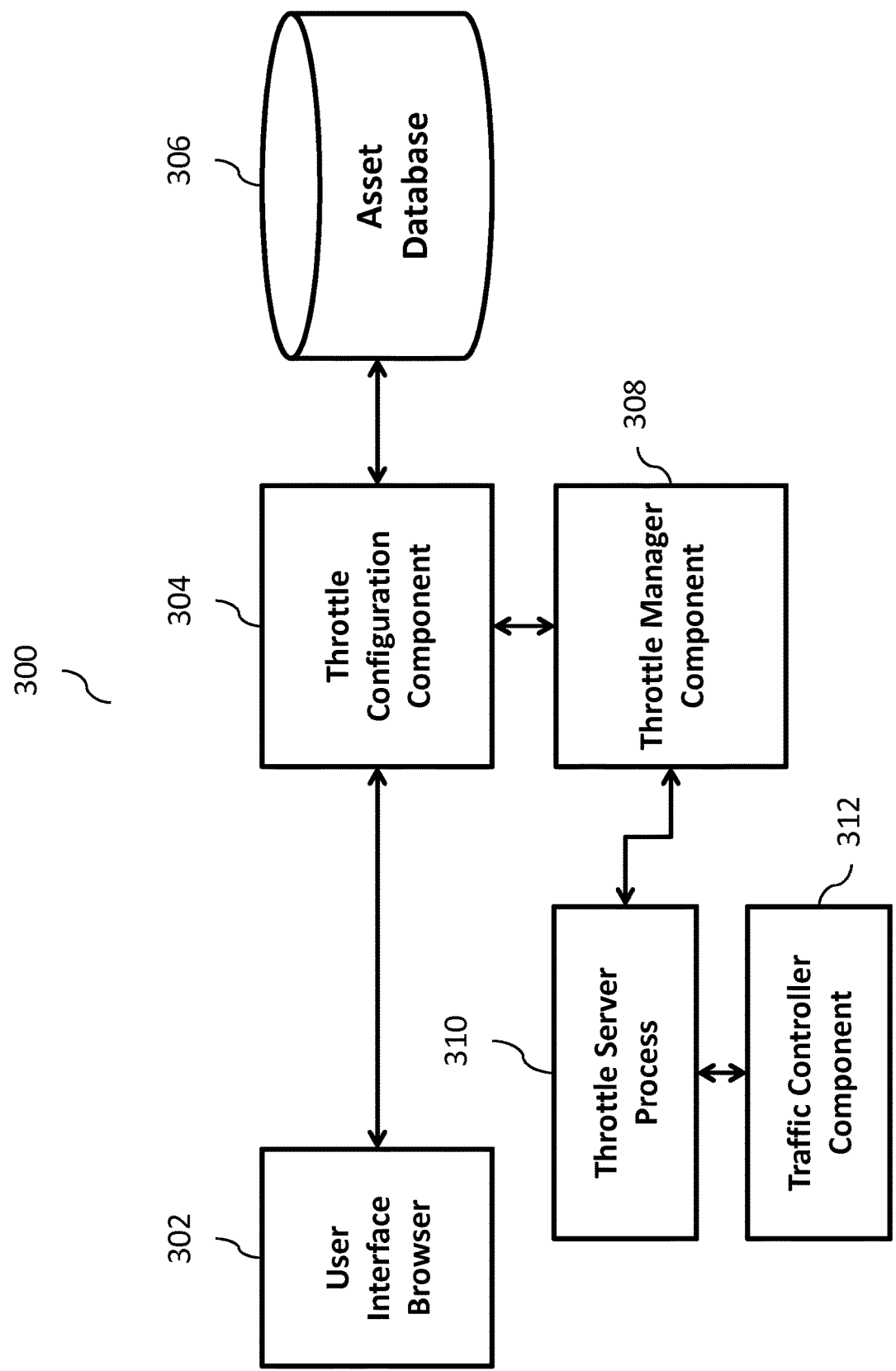
FIG. 3 illustrates an exemplary grid server system, according to some implementations of the current subject matter.

FIG. 3 illustrates exemplary functions of a grid server system 300, according to some implementations of the current subject matter. The functions of a grid server system 300 can be executed on a local grid server system (e.g., grid server system 202 shown in FIG. 2a) or on a remote grid server system (e.g., grid server system 210 shown in FIG. 2a). The functions 300 can include tasks associated with deduplication, storage, and/or any other processing of backup data streams. Such tasks can include, but are not limited to, bandwidth management, throttle control, etc.

The functions of the system 300 can include a throttle configuration component 304, an asset database 306, a throttle manger component 308, throttle server processes 310, and traffic controller component 312. Additionally, the functions of the system 300 can include a user interface browser 302 that can be used by a user (e.g., a backup administrator) for monitoring processes, such as, configuration, performing various actions associated with the backup, etc. The throttle manager component 308 is communicatively coupled with the throttle configuration component 304 (which is, in turn, communicatively coupled to the asset database 306) and throttle server processes 310 and traffic controller component 312.

In some implementations, the traffic controller component 312 can perform actual throttling (e.g., using thread workers employing Linux traffic control utility). The user interface browser 302 can be used to create/generate new network management policies and/or manage existing network management policies. Information about changes to one or more network management policies can be communicated to the throttle manager component 308 via the throttle configuration component 304. The network management policies can be stored within an asset database 306.

The throttle manager component 308 can be installed and can run on a grid server (e.g., grid server 204 shown in FIG. 2a) within each deduplication grid (e.g., grid 202 shown in FIG. 2a) that can replicate backup data to another site (e.g., site 210 shown in FIG. 2a). The throttle manager component 308 can be software, hardware and/or any combination of software and hardware. The throttle manager component 308 can perform bandwidth throttling functions for the grid server system 204. In some implementations, the throttle manager component 308 can throttle down or decrease bandwidth that can be available and/or consumed by one or more grid servers in the deduplication system. Alternatively, the component 308 can throttle up or increase bandwidth that can be available and/or consumed by one or more grid servers in the deduplication system. The throttle manager component 308 can also monitor total available bandwidth for the entire deduplication system to ensure that it does not exceed a predetermined bandwidth limit. Throttling up or down the bandwidth can be performed for the purposes of balancing available bandwidth among grid servers to ensure that one grid server is not overburdened while another grid server is idling. In some implementations, one or more throttle manager components 308 can be present in a deduplication system. Additionally, functionalities associated with the throttle manger component 308 can be transferred to another component within the grid server system 204. In some implementations, in the event of a system and/or software failure, there can be less than and/or more than a single throttle manager 308 per deduplication server grid system, thus, failover/recovery process can be executed to ensure that there is a single throttle manager component 308 running within the deduplication server grid system.

In some implementations, the throttle manager component 308 can be communicatively coupled with one or more throttle or worker server processes 310 that can perform the throttling functions. The throttle server processes 310 can run at a primary site (e.g., site 202 as shown in FIG. 2a) or a secondary site (e.g., site 210 as shown in FIG. 2a) or across a network (e.g., networks 206, 207, 208 as shown in FIG. 2a). The throttle manager component 308 can perform various network management tasks in relation to each of the throttle server processes 310, as will be discussed below.

In some implementations, the throttle manager component 308 can assign throttling functions to each throttle server process 310, can assign throttle limits (i.e., bandwidth that is available to a grid server in the deduplication system) using a throttle server process 310, rebalance individual throttle limits available to each grid server in the deduplication system using one or more throttle server processes 310, etc. The latter function can be performed by reallocating available bandwidth from grid servers that are not using their bandwidth to grid servers that either require such bandwidth and/or can use it. The throttle manager component 308 can throttle down the bandwidth consumed by grid servers using the throttle server processes 310 and/or throttle up the bandwidth consumed by other grid servers to ensure that the overall bandwidth limit for the entire deduplication grid system is not exceeded. In some implementations, the overall bandwidth limit can be predetermined for a particular system (where system administrator can present and/or can be made aware of bandwidth limits). In the event of a failure of the throttle manager component 308, each throttle server process 310 can continue to manage and/or use the last bandwidth limit that was assigned to a grid server (with which the throttle server process 310 was associated) prior to losing contact with the throttle manager component 308.

In some implementations, each throttle server process 310 in the deduplication system can report its own network usage and/or current throttle limit(s) to the throttle manager component 308. This can be done manually (i.e., upon a request), automatically (e.g., every predetermined time period, e.g. every 10 seconds, which can be configurable), and/or both. Each throttle server process 310 can respond to requests and/or commands from the throttle manager component 308. These requests/commands can include increasing, decreasing, and/or unchanging bandwidth assigned to a grid server being services by a particular throttle server process 310. As stated above, these requests/comments can be generated by the throttle manager component 308 in view of a total bandwidth limit for the deduplication system.

The throttle manager component 308 can also classify each throttle server process 310 into at least one of the following groups based on determination of each throttle server process's reported usage and/or limits: "need bandwidth", "balanced bandwidth", and "available bandwidth". These designations are provided herein for exemplary, illustrative purposes and are not intended to limit the subject matter of the present application. The "need bandwidth" group of throttle server processes 310 can correspond to grid servers that can be consuming or expect to consume more than a predetermined percentage (e.g., more than 95%) of the bandwidth that was previously allocated to them. Thus, the grid servers in this group can be looking to request additional bandwidth for processing of data. The "balanced bandwidth" group of throttle server processes 310 can correspond to grid servers that can be consuming bandwidth that was allocated to them within a balanced range (e.g., between 90% and 95%). Thus, the grid servers in this group do not require any additional bandwidth for processing of data. The "available bandwidth" group of throttle server processes 310 can correspond to grid servers that are not consuming or do not expect to consume the bandwidth that was allocated to them (i.e., the grid servers are consuming less than 90% of the bandwidth allocated to them). Thus, these grid servers can potentially relinquish at least a portion of their available bandwidth to be reallocated to other grid servers. In some implementations, the throttle manager component 308 can reallocate the available bandwidth from grid servers in the "available bandwidth" group to the "need bandwidth" group of grid servers. Further, the throttle manager component 308 can also reallocate bandwidth from the "balanced bandwidth" group of grid servers and/or "need bandwidth" group of grid servers (such as where a single grid server has been allotted most of the deduplication system's bandwidth and another grid server begins processing of data and requires bandwidth).

Figure 4:
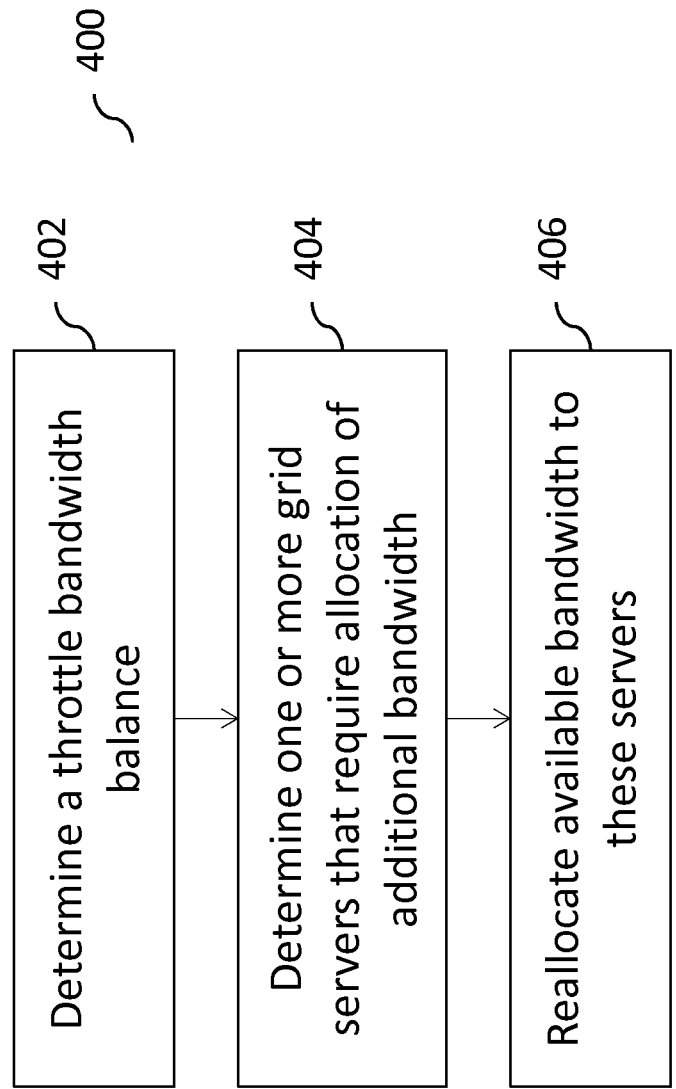
FIG. 4 is a flow chart illustrating a process for determining bandwidth to be allocated by the throttle manager component to a grid server, according to some implementations of the current subject matter.

FIG. 4 is a flow chart illustrating a process 400 for determining bandwidth to be allocated by the throttle manager component 308 to a grid server, according to some implementations of the current subject matter. At 402, the throttle manager component 308 can determine a throttle bandwidth balance using a difference between the total deduplication grid outgoing limit (where the outgoing limit can be predetermined for a particular system and can be preset by the system administrator and/or the system administrator can be made aware of it) and a sum of all bandwidths used by the grid servers in each of the three groups discussed above. At 404, the throttle manager component 308 can determine one or more grid servers that require allocation of additional bandwidth to them for processing. The throttle manager component 308 can repeat this process (in real time, dynamically, automatically, periodically, manually, etc.) to determine a grid server with a greatest need for bandwidth. At 406, once the grid servers are identified, the throttle manager component 308 can reallocate available bandwidth to these servers. The bandwidth can be allocated to all grid servers with the greatest need for bandwidth on an equal basis (e.g., each grid server in the "need bandwidth" group can be allocated an equal share of available bandwidth), based on the amount of bandwidth needed (e.g., grid server A receives 50% of the available bandwidth, server B receives 30%, etc.). The process 400 can be repeated by the throttle manager component 308 at a predetermined time periods, based on a request for more bandwidth is received, automatically, manually, and/or as desired.

For example, assuming that the total deduplication grid outgoing limit is set to 300 MB/sec, and there are three identical grid servers A, B and C that are currently transmitting at 95 MB/sec, 92 MB/s and 88 MB/s, respectively. Grid server A is in the "need bandwidth" group, grid server B is in the "balanced bandwidth" group and grid server C is in the "available bandwidth". As stated above, the amount of available bandwidth that can be reallocated to grid server A is 300−(95+92+88)=25 MB/sec. This additional bandwidth of 25 MB/sec can be reduced at grid server C and then allocated to grid server A, since it is the only server in the "need bandwidth" group. By performing this process (e.g., at predetermined time intervals (e.g., 10 seconds or any other time interval)), the bandwidth can be dynamically allocated thereby maximizing WAN bandwidth utilization across multiple transmitting grid servers within the deduplication system.

Referring back to FIG. 3, the throttle manager component 308 can start throttle server processes 310 on each grid server within a site (e.g., sites 202, 210 shown in FIG. 2a) when the deduplication system is first powered up. As new grid servers are added and/or removed from a deduplication system, the throttle manager component 308 can perform reallocation of the bandwidth across the remaining grid servers. Each throttle service process 310 can be requested to report to the throttle manager component 308 at predetermined periods of time (e.g., 10 seconds and/or any other time interval). If any throttle service process 310 does not report in to the throttle manager component 310 within another specified time period (e.g., 60 seconds or any other time interval), the throttle manager component 308 can attempt to restart the throttle service process 310. If the throttle service process 310 cannot be restarted, the throttle manager component 308 can then reallocate the bandwidth that was assigned to it to another throttle service process 310.

Figure 5:
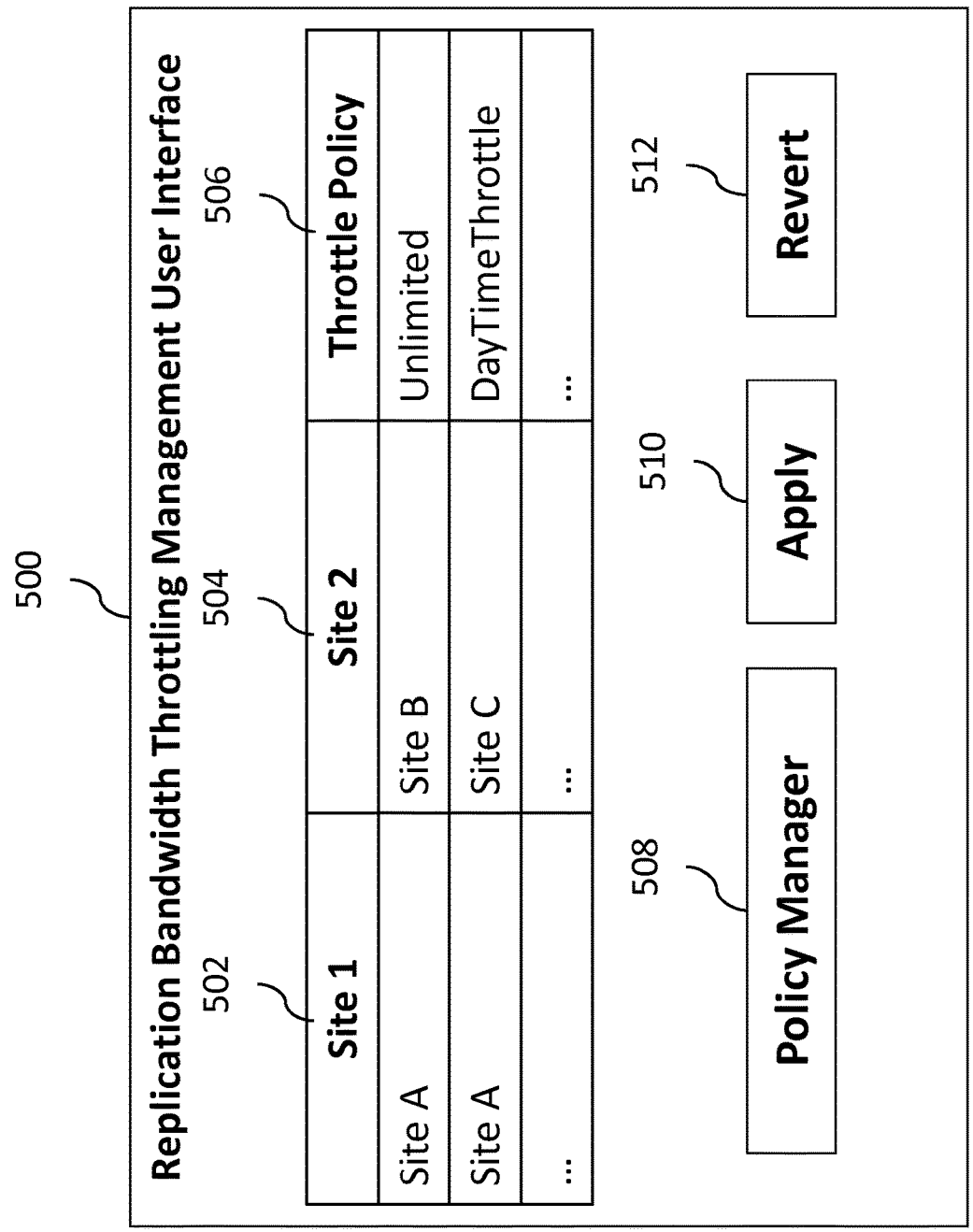
FIG. 5 illustrates an exemplary user interface for generating and assigning a network throttling policy for a deduplication system, according to some implementations of the current subject matter.
Figure 6:
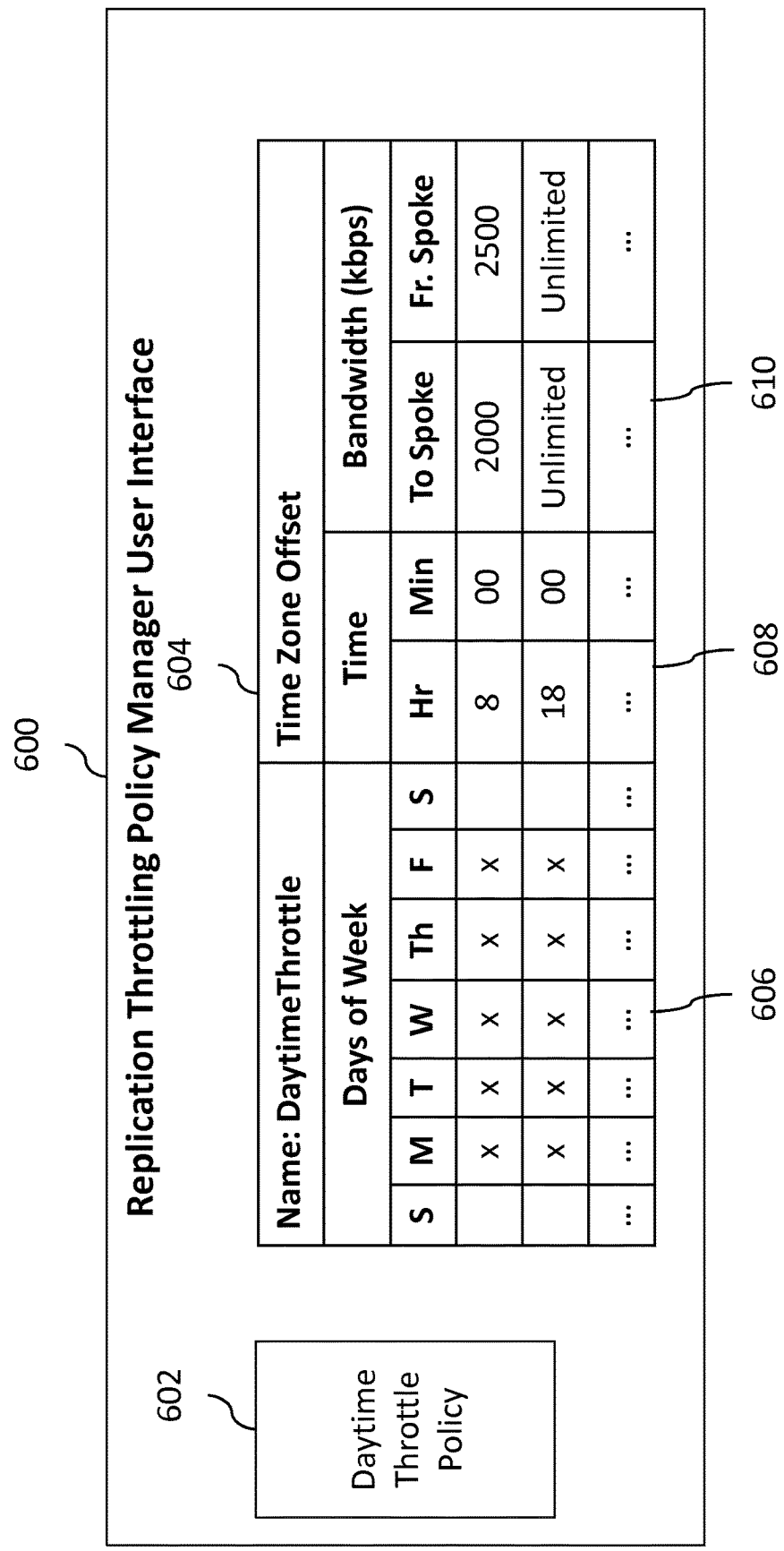
FIG. 6 illustrates an exemplary user interface for creating and/or modifying a network throttling policy, according to some implementations of the current subject matter.

FIG. 5 illustrates an exemplary user interface 500 for generating and assigning a network throttling policy for a deduplication system, according to some implementations of the current subject matter. The user interface 500 can be generated using the user interface browser 302 shown in FIG. 3. The user interface 500 can include a listing of sites 502, 504 and an indication of appropriate throttling policies that can be assigned to a particular site or a grid server (e.g., Site A, Site B, Site C). The throttling policies 506 can be assigned from a list of predetermined policies (e.g., "unlimited", "daytimethrottle", "AllDayWed" (providing maximum bandwidth of the entire link on Wednesdays from midnight to midnight), etc.). It should be noted that any number of policies can be created to accommodate a particular system and/or user needs. The list can be available to the user via a drop-down menu. As shown in FIG. 5, Site 1 502 can correspond to a transmitting deduplication grid (e.g., site 202 as shown in FIG. 2a) and Site 2 504 can correspond to a receiving deduplication grid (e.g., site 210 as shown in FIG. 2a). If the user desires to create a new throttling policy that is not available from the drop down list of policies, the user can access policy manager 508 and generate a new policy by specifying appropriate bandwidth limits, days, time, time periods, applicability, etc. (as shown in FIG. 6). Once the policy has been selected for a particular site and/or site pairs, the user can click apply button 510. If a reversal is desired, the revert button 512 can be used.

FIG. 6 illustrates an exemplary user interface 600 for creating and/or modifying a network throttling policy 602, according to some implementations of the current subject matter. The user interface 600 can be generated using user interface browser 302 shown in FIG. 3. FIG. 6 illustrates creation/modification of a "Daytime Throttle Policy" 602.

The throttling policy 602 can be created using format 604, which can include identification of days 606 when the policy is to be implemented, time period 608, and bandwidth range of 610 for the time period 608. The throttling policy 602 can represent a maximum allocated bandwidth across all grid servers within a deduplication system during a specific day/time period, e.g., a weekly periodic schedule. In some implementations, option of "unlimited" can disable network throttling during the day/time period specified.

Figure 7:
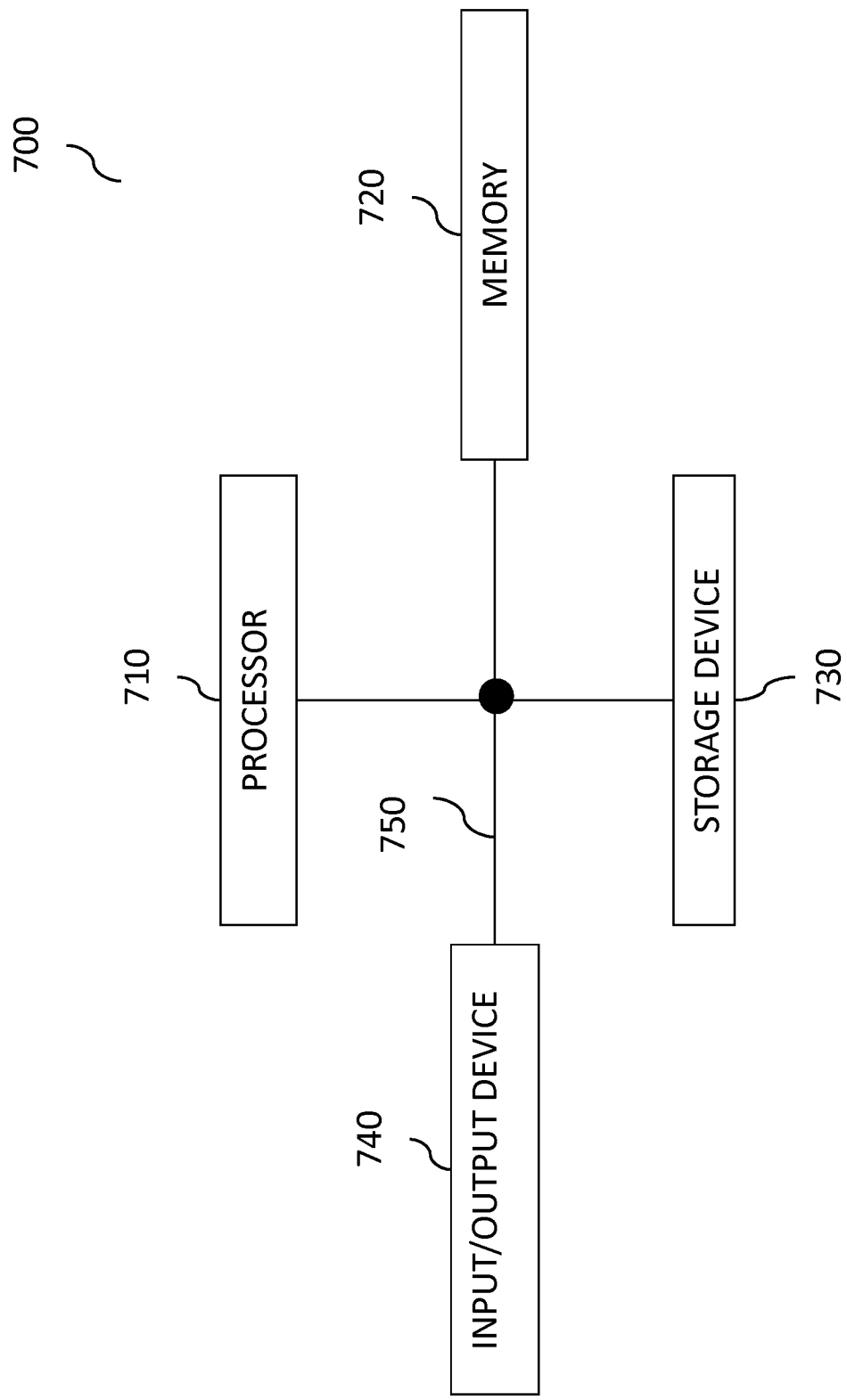
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
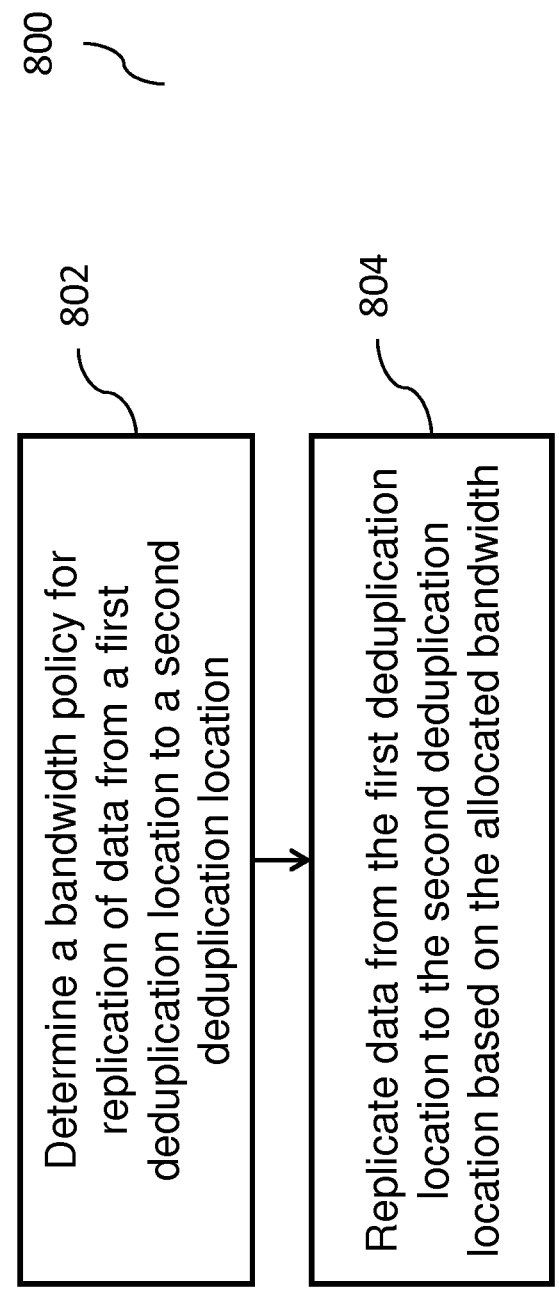
FIG. 8 illustrates an exemplary method, according to some implementations of the current subject matter.

FIG. 8 illustrates an exemplary method 800 for deduplicating data, according to some implementations of the current subject matter. The method 800 can be performed using components discussed above with regard to FIGS. 1-7. At 802, a bandwidth policy for replication of data from a first deduplication location to a second deduplication location can be determined. Based on the bandwidth policy, a predetermined bandwidth for the replication of data can be allocated. The deduplication locations (e.g., sites 202, 210 as shown in FIG. 2a) can be communicatively coupled via a network (e.g., networks 206, 207, 208 as shown in FIG. 2a). At 804, using the determined bandwidth policy, data from the first deduplication location can be replicated to the second deduplication location based on the allocated bandwidth.

In some implementations, the current subject matter can include one or more of the following optional features. The first deduplication site can include at least one first grid server for transmitting deduplicated data and the second deduplication site includes at least one second grid server for receiving the deduplicated data from the at least one first grid server. The bandwidth policy can be determined for replicating data from the first grid server to the second grid server.

In some implementations, the bandwidth policy can includes an indication of a time period during which the bandwidth policy is applicable to a server in at least one of the first deduplication location and the second deduplication location. The method 800 can also include performing, based on the determined bandwidth policy, at least one of the following: allocating additional bandwidth for consumption by the server, reducing an amount of bandwidth being consumed by the server, and unchanging an amount of bandwidth being consumed by the server. The allocating, reducing, and unchanging can be determined based on a total available bandwidth for at least one of the following: the first deduplication location and the second deduplication location.

In some implementations, the method 800 can include determining at least one server in at least one of the first deduplication and the second deduplication location requiring additional bandwidth, and allocating a portion of bandwidth being consumed by at least another server in at least one of the first deduplication and the second deduplication location to the first server.

In some implementations, allocation of bandwidth can be performed using at least one of the following: automatically, manually, periodically, and based on a predetermined time period.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

generating a bandwidth policy for replication of deduplicated data from a first deduplication location to a second deduplication location, the bandwidth policy allocating a predetermined total replication bandwidth for the replication of the deduplicated data from the first deduplication location to the second deduplication location during a period of time in a plurality of periods of time, the deduplication locations are communicatively coupled via a network, the first deduplication location including a plurality of first grid servers and the second deduplication location including a plurality of second grid servers, the allocated predetermined total replication bandwidth consuming a portion of a total processing bandwidth allocated to the first deduplication location and the second deduplication location, the total processing bandwidth including bandwidths allocated for receiving of backup data from one or more data sources and deduplication of the received backup data by the first deduplication location;

assigning, in accordance with the generated bandwidth policy, a replication bandwidth to each first grid server for the replication of the deduplicated data, the assigned replication bandwidth corresponds to a rate of transmission of the deduplicated data by each first grid server to one or more second grid servers, wherein a sum of assigned replication bandwidths does not exceed the allocated predetermined total replication bandwidth;

configuring each first grid server in the plurality of first grid servers to:

receive backup data, at a predetermined ingestion rate, from one or more data sources and deduplicate the received backup data to generate deduplicated data; and replicate, in accordance with the generated bandwidth policy and the period of time, the deduplicated data to one or more second grid servers in the plurality of second grid servers using at least a portion of the allocated predetermined total replication bandwidth, the deduplicated data being associated with predetermined recovery point objective time that represents an age of deduplicated data at the second deduplication location compared to the age of deduplicated data at the first deduplication location;

determining, for each first grid server, a first replication bandwidth actually consumed during the replication of the deduplicated data;

comparing, for each first grid server, its consumed first replication bandwidth to its assigned replication bandwidth and, based on the comparing, determining a reallocation of its assigned replication bandwidth, wherein the reallocation ensures at least one of: the predetermined ingestion rate is maintained, a deduplication rate of each first grid server is maintained, and the allocated total processing bandwidth is not exceeded, and includes at least one of the following: decreasing the assigned replication bandwidth, increasing the assigned replication bandwidth, and maintaining the assigned replication bandwidth;

assigning, for each first grid server, based on the determined reallocation of its assigned replication bandwidth a second replication bandwidth for consumption during the replication of a subsequently deduplicated data, wherein, for each first grid server, its assigned second replication bandwidth replaces its assigned replication bandwidth, wherein a sum of the assigned second replication bandwidths does not exceed the allocated predetermined total replication bandwidth; and determining, based on the assigned second replication bandwidths, an updated predetermined recovery point objective time, while ensuring the allocated total processing bandwidth is not exceeded, and maintaining at least one of the predetermined ingestion rate and the deduplication rate of each first grid server, the updated predetermined recovery point objective time being less than the predetermined recovery point objective time;

configuring each first grid server to further:
 replicate, using the assigned second replication bandwidth, the subsequently deduplicated data to the second deduplication location while ensuring the allocated total processing bandwidth is not exceeded and maintaining at least one of the predetermined ingestion rate and the deduplication rate of each first grid server, and the updated predetermined recovery point objective time.

2. The method according to claim 1, wherein the one or more first grid servers performs transmitting of the deduplicated data and the one or more second grid servers performs receiving the deduplicated data from the one or more first grid servers.

3. The method according to claim 1, wherein the bandwidth policy includes an indication of a time period during which the bandwidth policy is applicable to at least one grid server in at least one of the first deduplication location and the second deduplication location.

4. The method according to claim 1, wherein at least one of the decreasing the assigned replication bandwidth, the increasing the assigned replication bandwidth, and the maintaining of the assigned replication bandwidth is based on the allocated predetermined total replication bandwidth.

5. The method according to claim 1, further comprising determining at least one grid server in at least one of the first deduplication location and the second deduplication location requiring additional replication bandwidth; and allocating a portion of replication bandwidth being consumed by at least another grid server in at least one of the first deduplication location and the second deduplication location to the at least one grid server.

6. The method according to claim 1, wherein allocation of replication bandwidth is performed automatically, manually, or based on a predetermined time period.

7. A system comprising:
at least one programmable processor; and
a non-transitory machine-readable medium storing instructions that, when executed by the at least one programmable processor, cause the at least one programmable processor to perform operations comprising:

generating a bandwidth policy for replication of deduplicated data from a first deduplication location to a second deduplication location, the bandwidth policy allocating a predetermined total replication bandwidth for the replication of the deduplicated data from the first deduplication location to the second deduplication location during a period of time in a plurality of periods of time, the deduplication locations are communicatively coupled via a network, the first deduplication location including a plurality of first grid servers and the second deduplication location including a plurality of second grid servers, the allocated predetermined total replication bandwidth consuming a portion of a total processing bandwidth allocated to the first deduplication location and the second deduplication location, the total processing bandwidth including bandwidths allocated for receiving of backup data from one or more data sources and deduplication of the received backup data by the first deduplication location;

assigning, in accordance with the generated bandwidth policy, a replication bandwidth to each first grid server for the replication of the deduplicated data, the assigned replication bandwidth corresponds to a rate of transmission of the deduplicated data by each first grid server to one or more second grid servers, wherein a sum of assigned replication bandwidths does not exceed the allocated predetermined total replication bandwidth;

configuring each first grid server in the plurality of first grid servers to:
 receive backup data, at a predetermined ingestion rate, from one or more data sources and deduplicate the received backup data to generate deduplicated data; and
 replicate, in accordance with the generated bandwidth policy and the period of time, the deduplicated data to one or more second grid servers in the plurality of second grid servers using at least a portion of the allocated predetermined total replication bandwidth, the deduplicated data being associated with predetermined recovery point objective time that represents an age of deduplicated data at the second deduplication location compared to the age of deduplicated data at the first deduplication location;

determining, for each first grid server, a first replication bandwidth actually consumed during the replication of the deduplicated data;

comparing, for each first grid server, its consumed first replication bandwidth to its assigned replication bandwidth and, based on the comparing, determining a reallocation of its assigned replication bandwidth, wherein the reallocation ensures at least one of: the predetermined ingestion rate is maintained, a deduplication rate of each first grid server is maintained, and the allocated total processing bandwidth is not exceeded, and includes at least one of the following: decreasing the assigned replication bandwidth, increasing the assigned replication bandwidth, and maintaining the assigned replication bandwidth;

assigning, for each first grid server, based on the determined reallocation of its assigned replication bandwidth a second replication bandwidth for consumption during the replication of a subsequently deduplicated data, wherein, for each first grid server, its assigned second replication bandwidth replaces its assigned replication bandwidth, wherein a sum of the assigned second replication bandwidths does not exceed the allocated predetermined total replication bandwidth; and determining, based on the assigned second replication bandwidths, an updated predetermined recovery point objective time, while ensuring the allocated total processing bandwidth is not exceeded, and maintaining at least one of the predetermined ingestion rate and the deduplication rate of each first grid server, the updated predetermined recovery point objective time being less than the predetermined recovery point objective time;

configuring each first grid server to further:
replicate, using the assigned second replication bandwidth, the subsequently deduplicated data to the second deduplication location while ensuring the allocated total processing bandwidth is not exceeded and maintaining at least one of the predetermined ingestion rate and the deduplication rate of each first grid server, and the updated predetermined recovery point objective time.

8. The system according to claim 7, wherein the one or more first grid servers performs transmitting of the deduplicated data and the one or more second grid servers performs receiving the deduplicated data from the one or more first grid servers.

9. The system according to claim 7, wherein the bandwidth policy includes an indication of a time period during which the bandwidth policy is applicable to at least one grid server in at least one of the first deduplication location and the second deduplication location.

10. The system according to claim 7, wherein at least one of the decreasing the assigned replication bandwidth, the increasing the assigned replication bandwidth, and the maintaining of the assigned replication bandwidth is based on the allocated predetermined total replication bandwidth.

11. The system according to claim 7, wherein the operations further comprise
determining at least one grid server in at least one of the first deduplication location and the second deduplication location requiring additional replication bandwidth; and
allocating a portion of replication bandwidth being consumed by at least another grid server in at least one of the first deduplication location and the second deduplication location to the at least one grid server.

12. The system according to claim 7, wherein allocation of replication bandwidth is performed automatically, manually, or based on a predetermined time period.

13. A computer program product comprising a non-transitory machine-readable medium storing instructions that, when executed by at least one programmable processor, cause the at least one programmable processor to perform operations comprising:
generating a bandwidth policy for replication of deduplicated data from a first deduplication location to a second deduplication location, the bandwidth policy allocating a predetermined total replication bandwidth for the replication of the deduplicated data from the first deduplication location to the second deduplication location during a period of time in a plurality of periods of time, the deduplication locations are communicatively coupled via a network, the first deduplication location including a plurality of first grid servers and the second deduplication location including a plurality of second grid servers, the allocated predetermined total replication bandwidth consuming a portion of a total processing bandwidth allocated to the first deduplication location and the second deduplication location, the total processing bandwidth including bandwidths allocated for receiving of backup data from one or more data sources and deduplication of the received backup data by the first deduplication location;

assigning, in accordance with the generated bandwidth policy, a replication bandwidth to each first grid server for the replication of the deduplicated data, the assigned replication bandwidth corresponds to a rate of transmission of the deduplicated data by each first grid server to one or more second grid servers, wherein a sum of assigned replication bandwidths does not exceed the allocated predetermined total replication bandwidth;

configuring each first grid server in the plurality of first grid servers to:
receive backup data, at a predetermined ingestion rate, from one or more data sources and deduplicate the received backup data to generate deduplicated data; and
replicate, in accordance with the generated bandwidth policy and the period of time, the deduplicated data to one or more second grid servers in the plurality of second grid servers using at least a portion of the allocated predetermined total replication bandwidth, the deduplicated data being associated with predetermined recovery point objective time that represents an age of deduplicated data at the second deduplication location compared to the age of deduplicated data at the first deduplication location;

determining, for each first grid server, a first replication bandwidth actually consumed during the replication of the deduplicated data;

comparing, for each first grid server, its consumed first replication bandwidth to its assigned replication bandwidth and, based on the comparing, determining a reallocation of its assigned replication bandwidth, wherein the reallocation ensures at least one of: the predetermined ingestion rate is maintained, a deduplication rate of each first grid server is maintained, and the allocated total processing bandwidth is not exceeded, and includes at least one of the following: decreasing the assigned replication bandwidth, increasing the assigned replication bandwidth, and maintaining the assigned replication bandwidth;

assigning, for each first grid server, based on the determined reallocation of its assigned replication bandwidth a second replication bandwidth for consumption during the replication of a subsequently deduplicated data, wherein, for each first grid server, its assigned second replication bandwidth replaces its assigned replication bandwidth, wherein a sum of the assigned second replication bandwidths does not exceed the allocated predetermined total replication bandwidth; and determining, based on the assigned second replication bandwidths, an updated predetermined recovery point objective time, while ensuring the allocated total processing bandwidth is not exceeded, and maintaining at least one of the predetermined ingestion rate and the deduplication rate of each first grid server, the updated predetermined recovery point objective time being less than the predetermined recovery point objective time;

configuring each first grid server to further:
    replicate, using the assigned second replication bandwidth, the subsequently deduplicated data to the second deduplication location while ensuring the allocated total processing bandwidth is not exceeded and maintaining at least one of the predetermined ingestion rate and the deduplication rate of each first grid server, and the updated predetermined recovery point objective time.

14. The computer program product according to claim 13, wherein the one or more first grid servers performs transmitting of the deduplicated data and the one or more second grid servers performs receiving the deduplicated data from the one or more first grid servers.

15. The computer program product according to claim 13, wherein the bandwidth policy includes an indication of a time period during which the bandwidth policy is applicable to at least one grid server in at least one of the first deduplication location and the second deduplication location.

16. The computer program product according to claim 13, wherein at least one of the decreasing the assigned replication bandwidth, the increasing the assigned replication bandwidth, and the maintaining of the assigned replication bandwidth is based on the allocated predetermined total replication bandwidth.

17. The computer program product according to claim 13, wherein the operations further comprise
    determining at least one grid server in at least one of the first deduplication location and the second deduplication location requiring additional replication bandwidth; and
    allocating a portion of replication bandwidth being consumed by at least another grid server in at least one of the first deduplication location and the second deduplication location to the at least one grid server.

18. The computer program product according to claim 13, wherein allocation of replication bandwidth is performed automatically, manually, or based on a predetermined time period.

\* \* \* \* \*